US008990802B1

(12) United States Patent
Shapiro et al.

(10) Patent No.: US 8,990,802 B1
(45) Date of Patent: Mar. 24, 2015

(54) PINBALL VIRTUAL MACHINE (PVM) IMPLEMENTING COMPUTING PROCESS WITHIN A STRUCTURAL SPACE USING PVM ATOMS AND PVM ATOMIC THREADS

(75) Inventors: Benjamin V. Shapiro, Cupertino, CA (US); Roman Shapiro, Cedar Grove, NJ (US)

(73) Assignee: Thinking Software, Inc., Los Gatos, CA (US)

( * ) Notice: Subject to any disclaimer, the term of this patent is extended or adjusted under 35 U.S.C. 154(b) by 602 days.

(21) Appl. No.: 13/113,908

(22) Filed: May 23, 2011

Related U.S. Application Data (60) Provisional application No. 61/396,204, filed on May 24, 2010.

(51) Int. Cl.
  G06F 9/455 (2006.01)
  G06F 9/46 (2006.01)
(52) U.S. Cl.
  CPC .................................. G06F 9/455 (2013.01)
  USPC ................................ 718/1; 718/102; 718/106
(58) Field of Classification Search
  None
  See application file for complete search history.

(56) References Cited

U.S. PATENT DOCUMENTS

| 7,480,840 B2 * | 1/2009 | Hathorn et al. ............... 714/724 |
| 2002/0078115 A1 * | 6/2002 | Poff et al. ......................... 709/1 |
| 2003/0110366 A1 * | 6/2003 | Wu et al. ....................... 712/225 |
| 2004/0154011 A1 * | 8/2004 | Wang et al. ................... 717/158 |
| 2006/0271395 A1 * | 11/2006 | Harris et al. ...................... 705/1 |
| 2008/0288915 A1 * | 11/2008 | Krablin et al. ................ 717/104 |
| 2010/0205602 A1 * | 8/2010 | Zedlewski et al. ................ 718/1 |

* cited by examiner

*Primary Examiner* — Meng An
*Assistant Examiner* — Tammy Lee

(57) ABSTRACT

Methods, apparatuses, and computer-readable media for implementing and executing computer processes in an efficient manner. In an apparatus embodiment of the present invention, a pinball virtual machine (PVM) (99) is adapted to implement multiple PVM atomic threads (1040) within a single instance of an execution of a single method within an executable software process, said PVM (99) comprising: a code transformer (100) adapted to transform executable computer code (107) to PVM atoms (1020), a PVM graph (102), and PVM code segments (104); and coupled to the PVM graph (102), a PVM atomic threads manager (1011) implemented to control execution of a plurality of PVM atoms (1020) organized in PVM atomic threads (1040).

22 Claims, 9 Drawing Sheets

Fig. 4 Legends

Fig. 9 PVM structure of the method "setupPreprocessor"

Fig. 10 PVM Components

PINBALL VIRTUAL MACHINE (PVM) IMPLEMENTING COMPUTING PROCESS WITHIN A STRUCTURAL SPACE USING PVM ATOMS AND PVM ATOMIC THREADS

RELATED PATENT APPLICATIONS AND PATENTS

This patent application claims the priority benefit of commonly owned U.S. provisional patent application 61/396,204 filed May 24, 2010 entitled "Method and Apparatus for Implementing a Computing Process Within a Structural Space—Pinball Virtual Machine (PVM)"; and hereby incorporates said provisional patent application in its entirety, as well as the following three patents in their entireties, by reference into the present patent application: U.S. Pat. No. 5,522,036 issued May 28, 1996 to Benjamin V. Shapiro and entitled "Method and Apparatus for the Automatic Analysis of Computer Software"; U.S. Pat. No. 6,769,073 issued Jul. 27, 2004 to Benjamin V. Shapiro and entitled "Method and Apparatus for Building an Operating Environment Capable of Degree of Software Fault Tolerance"; and U.S. Pat. No. 7,316,001 issued Jan. 1, 2008 to Steven Allen Gold, David Marvin Baker, Vladimir Gusev, and Hongping Liang and entitled "Object Process Graph System".

TECHNICAL FIELD

The invention presented herein relates to a generic method of implementation of programmable processes within programmable digital data processing machines, e.g., computers.

BACKGROUND ART

In the present state of the art, run-time implementation of a computing process has a close relationship to the way the process is coded. In our opinion, such implementation is not the most efficient.

The traditional representation of the process by its source code, line after line after line, even when indentations are used, is also not very efficient for process understanding. Indentations, even when their use is more or less standard, provide limited help. The code, even with indentations, is still represented in one dimension, top to bottom.

Sometimes graphs are automatically generated from the process source code. However, these graphs are usually created to represent a process on a higher level, usually on the level of procedures, functions, methods, classes, paragraphs, and so on. Some graphs may include nodes on the level of statements. However, those methods are still not generic and not structural enough to be used for generic process architecture.

The state of the art run-time implementations of computing processes in executable form presented to the computing system are not the most suitable for automatic/automated tools, which in turn would be able to provide dynamic analysis of the process execution, process understanding, and maintenance, and constitute a first approach to the computing process fault tolerance in terms of faulty program logic.

Secondly, presently used representations of a computer program in its source code form are not, in our opinion, sufficient for a comprehensive understanding of the computing processes by a human programmer/software engineer.

SUMMARY OF THE INVENTION

The following description introduces a special method for generating programmable computing processes. The resulting target process implementation is better suited for both a) automated tools for target process understanding and maintenance and b) easier understanding of the computing processes by a human, even by a non-programmer computer user. The method described here does not introduce any new programming language and is not a substitution for any existing programming language. The PVM (Pinball Virtual Machine) atoms 1020 and PVM graphs 102 of the present invention can be created from code generated by traditional compilers 106.

Described here is an implementation of a computing process using the PVM method, allowing for additional features as additions to traditional VMs (Virtual Machines), like JVM (Java Virtual Machine) and others, allowing the PVM 99 to deliver higher speeds of processing by utilizing multi-core computing devices 140 more effectively. Described here, PVM atomic threads 1040 allow for simultaneous execution of several PVM atomic threads 1040 within a single instance of a method execution, as opposed to traditional multithreading where an instance of a single method execution is not shared between different threads.

PVM 99 implementation of a target computing process, when it is being automatically converted into a graph form and when using the legends proposed here, is extremely helpful to computer program developers, maintenance persons, and technical support persons. (Refer to FIGS. 4 through 7.)

Independent of the fact of whether the original computing process was encoded for implementation by the PVM method, or whether it was converted into PVM representation, when represented in the PVM implementation it brings benefits in all the following cases:

When a maintenance person is the author of the application.

When the application is an open source application.

When an end-user purchased the rights to the application source.

It is easy to see that with the proliferation of Open Source software, the potential for computing process representation using the PVM method can grow exponentially. In general, all computing process users, i.e., professionals such as programmers, testers, and technical support professionals, as well as computing end-users, can benefit by becoming more intelligent in understanding the processes run within their applications.

The PVM method is a method for implementing "methods" of computing processes (or "functions" of computing processes; called differently within different programming languages) using bi-directional trees 102, where each node of the tree 102 is a generic executable PVM Atom 1020, as described below. All the PVM Atoms 1020 are generic and separately reprogrammable, which allows for a higher level of control, diagnosis, and maintenance, and easier modification of a computing process 107.

Simplicity and the generic nature of the resulting PVM Graph 102 allows even a non-professional to get a basic understanding of a program's algorithm. Any computing program can be represented by a PVM Graph 102. The implementation of the PVM atoms 1020 can be done as well as in the present traditional computing architectures, as in future computing architectures, where the PVM Atom 1020 could be represented, for example, by a nano-technological component.

BRIEF DESCRIPTION OF THE DRAWINGS

These and other more detailed and specific objects and features of the present invention are more fully disclosed in the following specification, reference being had to the accompanying drawings, in which:

FIG. 2 also shows a computer processor 140 hosting the PVM Method's processes, as well as a computer keyboard 230 and computer mouse 220 whereby a human user can interact with the processor 140.

DETAILED DESCRIPTION OF THE PREFERRED EMBODIMENTS

Why a "Pinball Virtual Machine" (PVM)?

Figure 8:
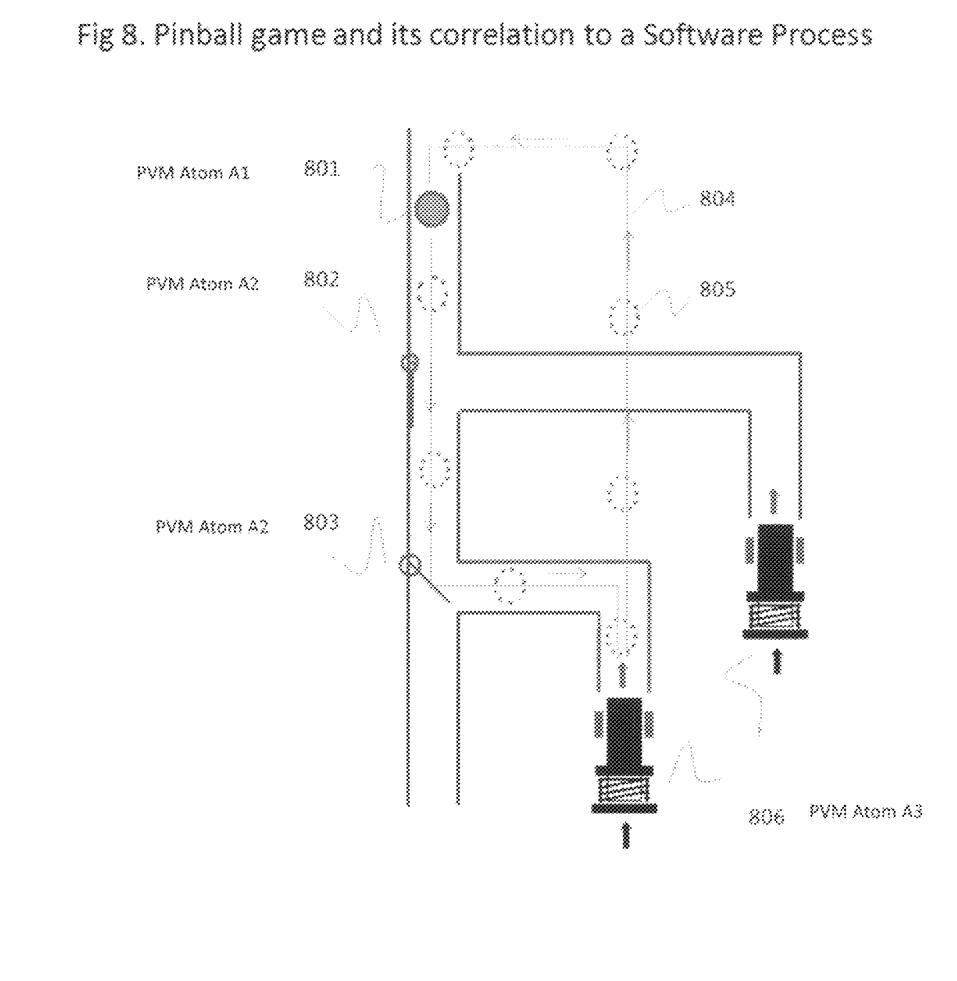
FIG. 8 shows the correlation between a computer process and a pinball game, explaining the reasoning behind the name "Pinball Virtual Machine".

Referring to FIG. 8, the Pinball Virtual Machine 99 can be understood as a machine controlling a state of a process, where the state is represented by a position of a ball. The three controlling elements 801, 802, 803 are "Free Fall atoms" of type A1, "Shift Potential atoms" of type A2, and "Rewind atoms" of type A3, respectively. The atoms of types A1, A2, and A3 are described in the next paragraphs.

The terms used in this written description often refer to the Java programming language. However, PVM implementation is programming language independent. Therefore, corresponding structures and names used in other programming languages should be assumed when applying this description to these other languages. Accordingly, when references to JVM (Java virtual machine) are found in this text, references to any other VM (virtual machine) or any other OS (operating system) are implied.

An executable code in its PVM implementation is a combination of bidirectional trees. Each Class (or other loadable executable component) in its PVM implementation is a bi-directional tree that has a node representing the class and nodes for its children, the members of the class, i.e., class fields (data members), and methods (functions). Each method is, in turn, also represented by a bidirectional tree.

Figure 7:
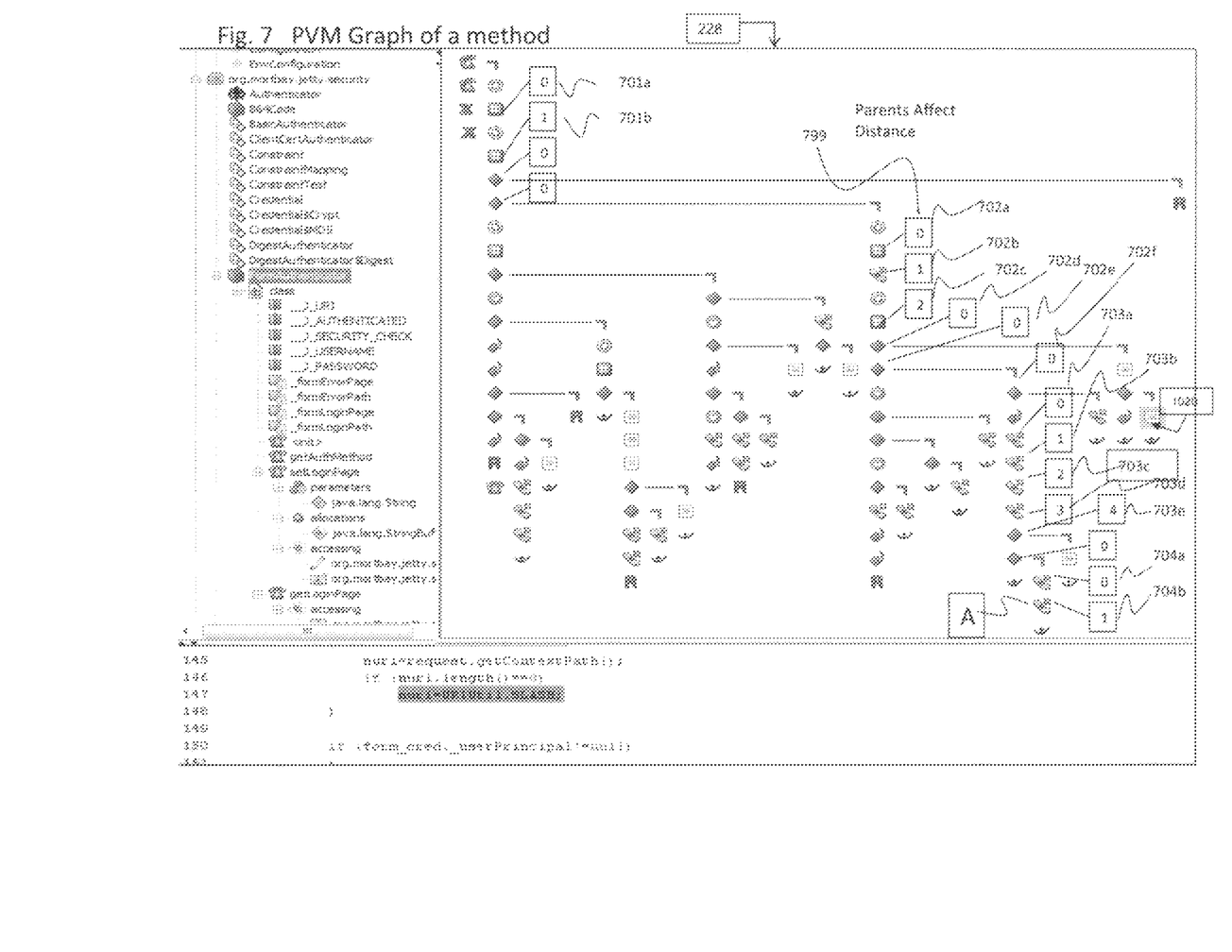
FIG. 7 shows a sample of a complete method represented in the visual PVM graph 228 on one screen 211, which would take seven screens in traditional source code form.

Referring to FIG. 7, the highlighted node 1020 of the FormAuthenticator class (highlighted in an icon of a cube) has as its children nodes of data members and methods. The method "authenticate" is represented on the right of the screen in its PVM form as a bidirectional graph.

Figure 1:
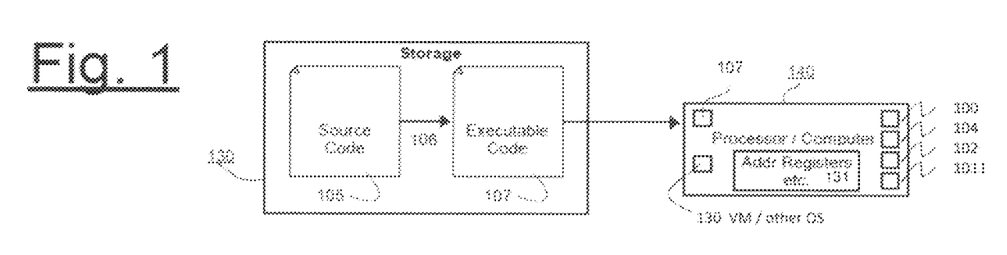
FIG. 1 is a block diagram showing components of the present invention in a computing device 140, including:
- traditional bytecode or other executable code 107,
- executable code transformer 100 which transforms the code 107 into PVM atoms 1020 arranged in a PVM Graph 102,
- executable code 107 arranged into PVM Code Segments (PCSs) 104,
- PVM Graph 102,
- PVM atomic threads manager 1011,
- traditional VM or other OS (operating system) 130,
- address registers and similar items 131.
Figure 2:
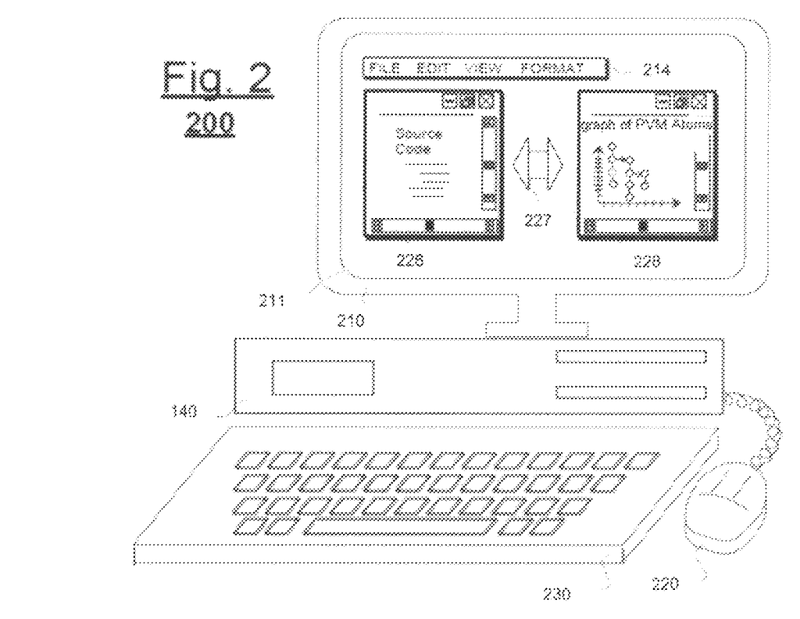
FIG. 2 shows a visual display 228 of PVM graph 102 displayed along with a visual display 226 of source code component 107 of a process being opened by a File Edit command 214. PVM graph visual component 228 and source code visual component 226 are tightly coupled (via connection 227) on a combined screen view 211 on monitor 210.
Figure 3:
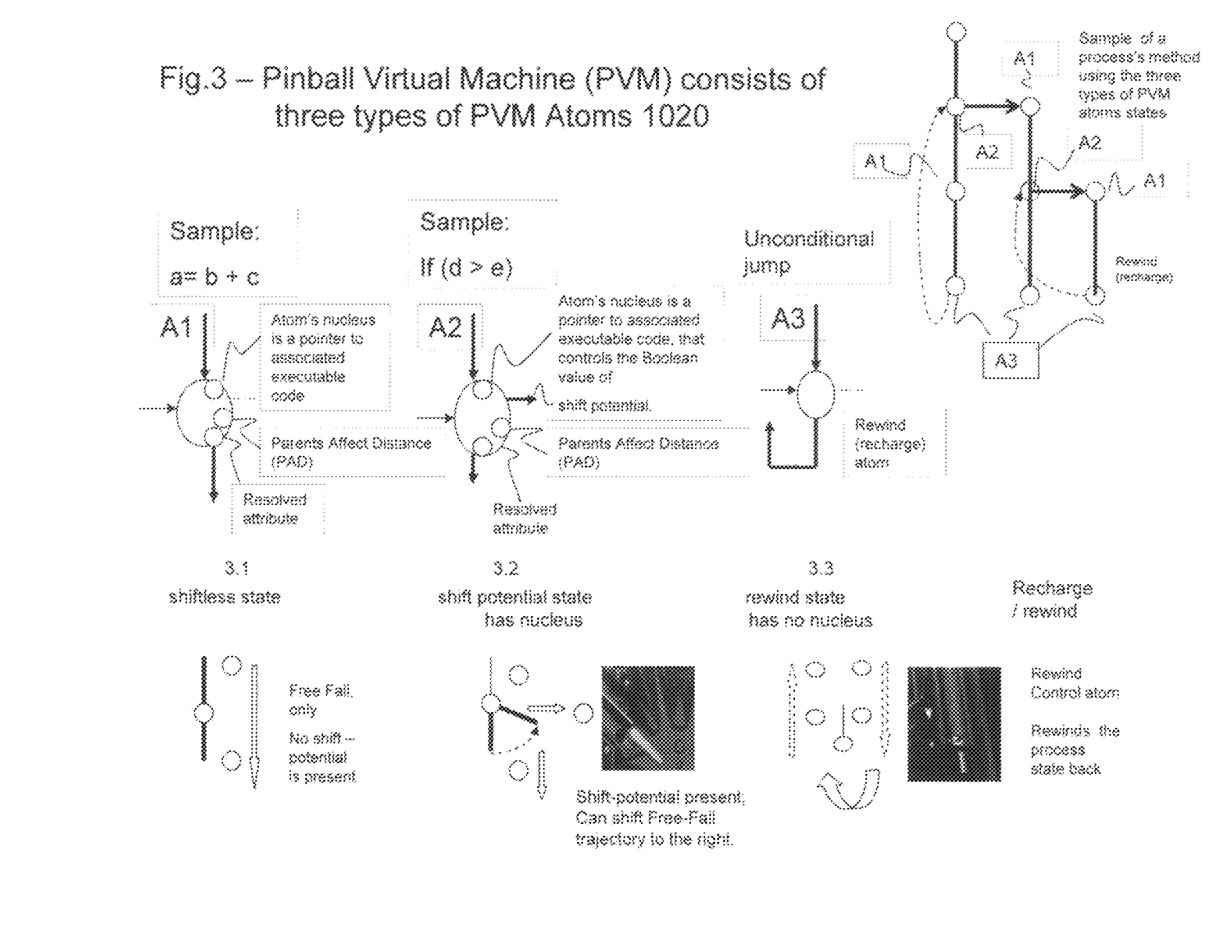
FIG. 3 shows the three states of a generic PVM atom 1020 of the present invention.
Figure 4:
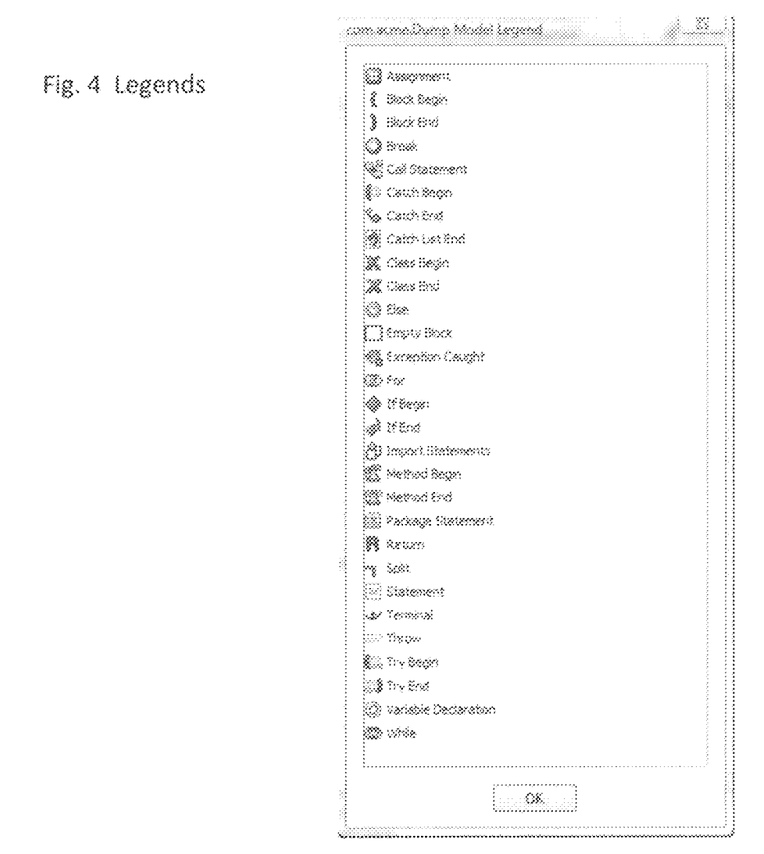
FIG. 4 shows graphical legends assigned to different types of code constructs when the code 107 is represented by a visual PVM graph 228.

Each method (function) of a class (loadable executable module) is implemented by a bidirectional tree consisting of three states of PVM atoms 1020: A1, A2, and A3. Referring to FIG. 3, a generic (raw) PVM atom 1020 comprises at least some of the following seven attributes:

1. Control input from a parent node "parent control input".
2. Control input from a rewind output of some other node—"rewind control input".
3. Shift Potential control output. Shift potential control output is always present in an atom A2, and has a Boolean value of On or Off, depending on the result of the execution of this A2 atom nucleus.
4. Free Fall control output. Free Fall control output is always present in all three types of atoms.
5. Atom nucleus 102a. Atom Nucleus 102a is a reference to executable code, which execution produces a specific result. Only atoms A1 and A2 have a nucleus 102a. In case of an Atom A2, the execution of the nucleus 102a decides the state of the Boolean value of the Shift Potential. In case of an Atom A1, the execution of the nucleus 102a decides the value of the result of A1. Atom nucleus 102a refers to a PVM Code Segment (PCS) 104, described further. Each PCS 104 is a sequence of bytecode/other executable code instructions 107 corresponding to one source code 105 instruction.
6. Parents Affect Distance (PAD) 102b. This attribute 102b allows for the run-ahead execution of the atom 1020. PAD is present only in A1 and A2 atoms (executable atoms, i.e., atoms having a nucleus).
7. Resolved attribute 102c (described further).

Atom of type A3—control rewind atom—has only two of the seven attributes—its "parent control input" and its "free fall" output, where the "free fall" output performs the function of a control rewind by pointing to another atom's "rewind" input. That is done by the value of the "free fall" attribute being an index of that other PVM Atom 1020. In case when an A3 atom corresponds to a Return source code statement, its "free fall" output attribute is Zero. Atoms of type A3, having no nucleus 102a, are process control atoms, while atoms A1 and A2 are executable atoms.

The resulting construct that is the product of connections between the PVM atoms 1020 uniquely defines any given method's algorithm. That is, PVM atoms 1020 cannot be rearranged without the corresponding process being changed.

Each PVM atom 1020 is strictly oriented in space and in relation to other atoms 1020. While the "directions" described below in this paragraph are implementation specific, the consistency is necessary. In our implementation (referring to FIG. 3):

1. A Rewind Control Input is on the left of the atom 1020.
2. A Free Fall Output (or rewind output for an A3 type PVM atom) is on the bottom of the atom 1020.

3. A Shift Potential Output is on the right of the atom 1020.
4. A Parent Control Input is on the top of the atom 1020.

Referring to FIG. 3, the atoms marked as A2 and representing the control split are processed by a separate PVM atomic thread 1040. This thread "A2NucleusProcessingThread is responsible for calculating the Boolean values for resolving corresponding splits.

This creates the following advantages:

A. More efficient use of multi-core computers 140.
B. Allowing for a possibility of "dynamic look ahead".

Figure 5:
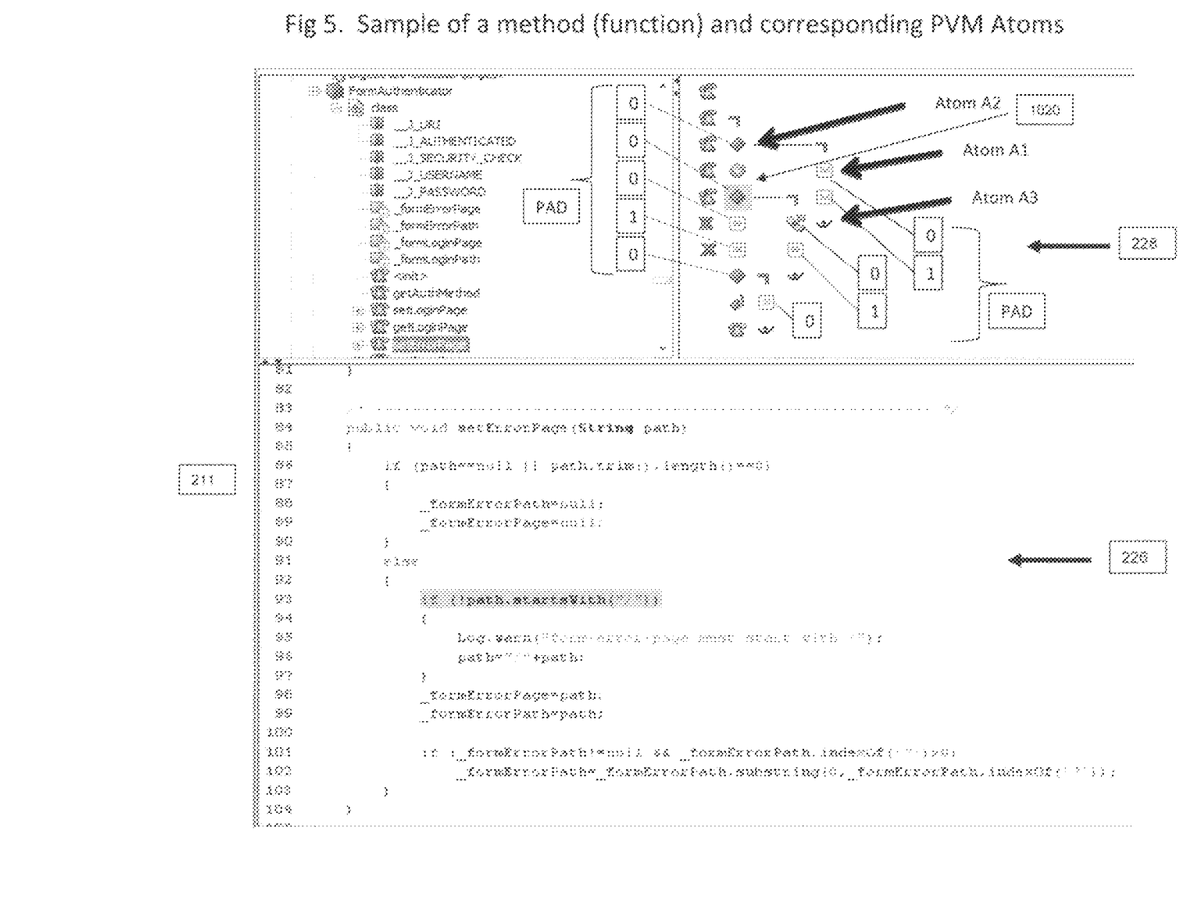
FIG. 5 is a sample of a method (function) "setErrorPage" and corresponding PVM Atoms 1020.

Referring to FIG. 5, "Sample of a method (function) and corresponding PVM atoms", please see the method "setErrorPage". The three types of PVM atoms, A1, A2, and A3, are marked. The meaning of the legends used is defined within FIG. 4 "Legends". Referring to FIG. 3 "PVM atoms", we can see that the three states of the generic PVM atoms 1020 are sufficient for implementation of any process.

Going further, we will call the "Free Fall Control Output" a "free fall output", and the "Shift Potential Control Output" a "shift potential output". In our implementation, the free fall output of a node is implemented by the node's left child, and is positioned in our graph 102 in the direction down (implementing the "free fall"). Thus, combinations of "Free Fall" control outputs create control verticals. The number of Free Fall Control Verticals (FFCV) in any process is determined by the number of control splits S. The relationship is ΣFFCV=ΣS+1

Each FFCV is terminated by a node of an atom A3, which in turn uniquely identifies its corresponding FFCV. Each control split S is implemented by an atom A2.

Therefore, the relationship between the number of atoms of type A2 and atoms of type A3 in any given process is ΣA3=ΣA2+1

The shift potential output is, in our implementation, done by the right child, and is in the direction to the right. The "shift potential output" is the potential for a shift of control. When the shift potential atom A2 is executed, the Boolean value that is the result of the execution of code pointed to by the atom's nucleus controls whether the shift is taken or not. When the value is 1, the shift is taken and control is shifted to another Free Fall Control Vertical (FFCV).

Shift potential atoms of any process correspond to logic split statements, i.e., "IF" and "Case" statements, entering the body of the loop constructs (For, While, Do), and so on.

Figure 9:
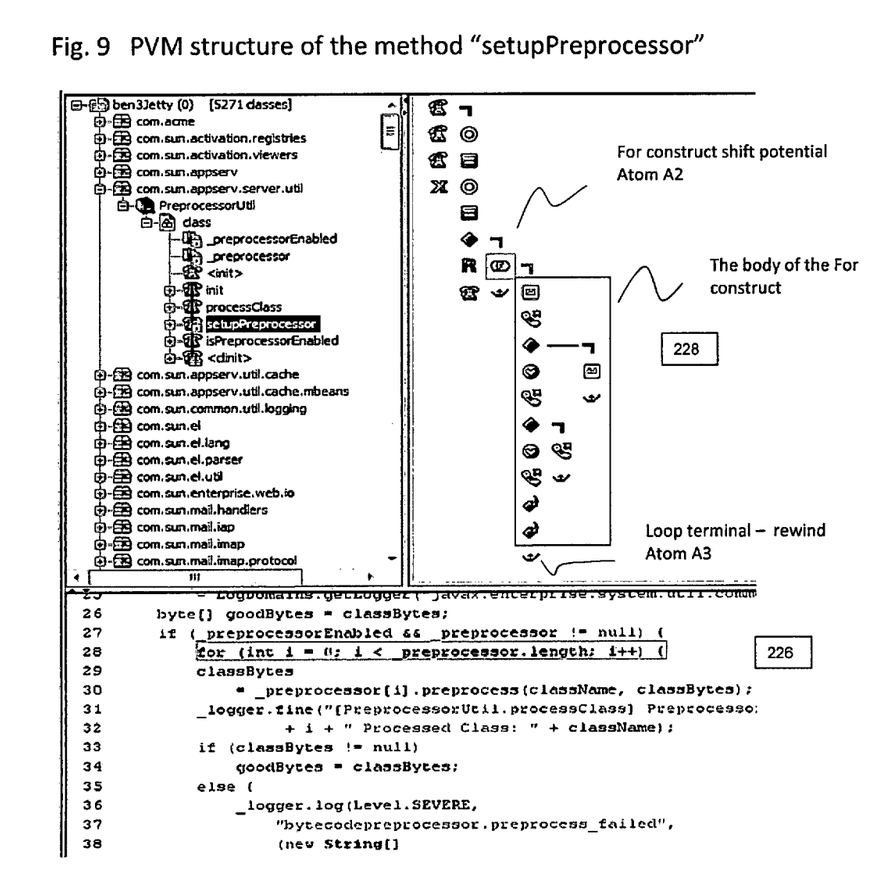
FIG. 9 shows the "shift potential" of loop constructs such as a For loop, Do loop, and While loop, within the corresponding visual PVM graph view 228.

Loop terminals are implemented by rewind atoms A3. On the exit from a loop, the corresponding A2 atom is resolved in the Free Fall direction (refer to FIG. 9).

Resulting two dimensional representation of any method by a strictly ordered bi-directional tree 102 significantly simplifies an understanding of the process and understanding of its dynamic behavior. In our visual implementation of the resulting PVM graph 228, each state of a PVM Atom 1020 is represented by its own icon (FIG. 3 and FIG. 4.), further depending on the nature of the corresponding nucleus. For example, the icon of a FOR nucleus (atom A2) is different from the icon of an IF nucleus (atom A2).

Advantages of the Combined View of the Process Code, being Represented by Two Components, Traditional Visual Source Code 226 and its PVM Visual Graph 228.

Figure 6:
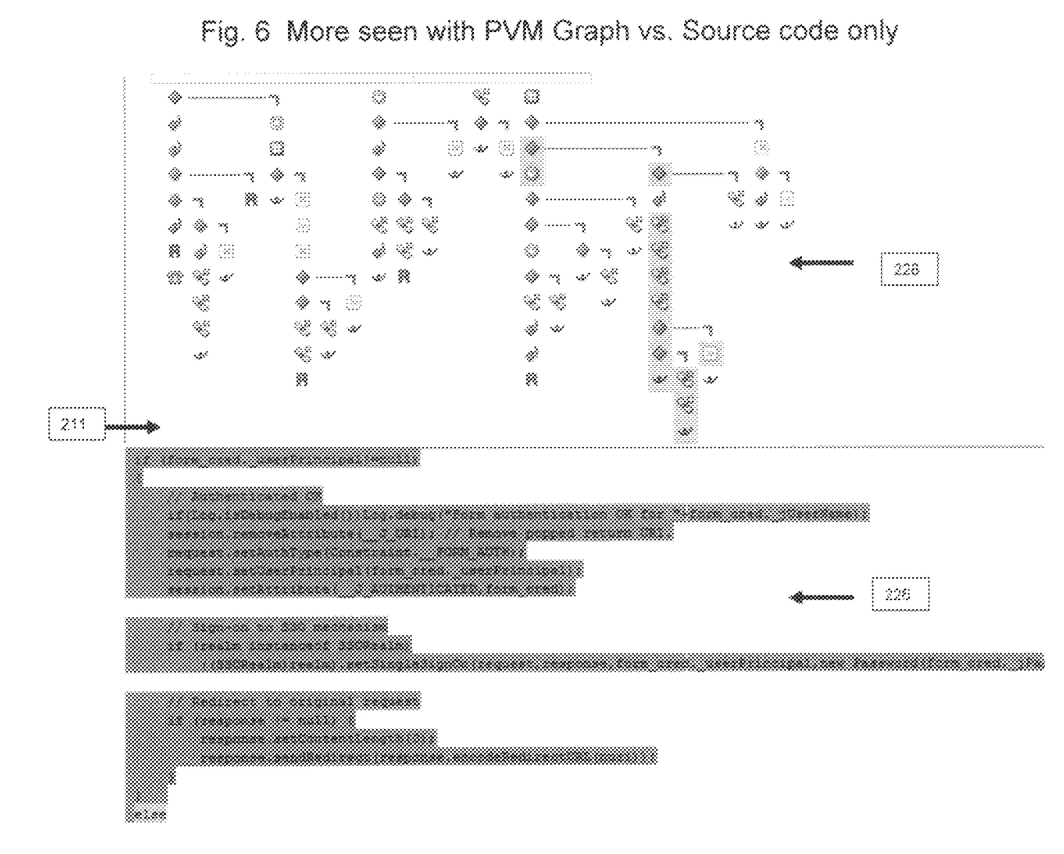
FIG. 6 shows two forms of source code 107: traditional source code form 226 and a corresponding portion of the PVM graph component 228, demonstrating the advantage of a combined view.

Referring to FIG. 6, we can see that the entire highlighted view of the visual source code 226, on the bottom of the screen 211, corresponds to the highlighted portion of the PVM visual Graph 228. Therefore, the real estate of the screen 211 more efficiently allows seeing the code 107 in the form of a graph 228. Approximately seven times more of the code 107 can be seen in its graph 228 form. Additionally, the strict construct of the PVM graph 228, through its two dimensional structure, allows seeing the structure of the programmed method, while the traditional form source code statements 226 does not do this job very well.

There is a very specific advantage in having both forms 226, 228 displayed for a software engineer creating or maintaining the computing process. In our implementation, both forms of the method representation, the original source code form 226 and the PVM graph form 228, are tightly coupled via connection 227. That is, selecting a structure within one form will automatically select a corresponding structure within the other form. Referring to FIG. 5, the selected atom 1020 on the PVM graph 228 corresponds to the automatically selected statement construct from the source code 226 displayed on the bottom of the screen 211.

This arrangement allows the PVM graph 228 to act as a zoomed out view of the selected source code 107, seeing selected source code 107 viewed in the real context of its surrounding structure. That allows one to see its cause, and its effect within the process more precisely.

In our implementation, a mouse 220 over a PVM atom 1020 displays code 107 corresponding to its 1020 nucleus. That allows the advantages of both effects, a zooming out view of the complete code 107 structure, and a zooming in to a specific nucleus of any atom 1020.

Looking at the example on FIG. 7, which visually represents a PVM graph 228 of the entire method "authenticate" of the class "FormAuthenticator" of the package "org.mortbay.jetty.security" (open source), we can see that in order for the selection on the graph 228 to become an active state of that process, the three logic splits (Atoms A2) have to be resolved positively (as Yes), i.e., in the direction of their right children.

A mouse 220 over these three PVM A2 atoms shows how their nuclei resolved in the positive direction. From top to bottom, the nuclei of these three logic splits and of the atom of our interest correspond to the following code:

if (ur.endsWith(_J_SECURITY_CHECK)) if (nuri==null∥nuri.length( )=0)
if (nuri.length( )=0)−nuri=URIUtil.SLASH;
Run-ahead execution of PVM Atoms 1020

Referring to FIG. 5, one of the attributes of a PVM atom 1020 is a "Parents Affect Distance" (PAD) 102*b*. The PAD 102*b* of a node N of an atom A is defined through the number of steps T in the PVM graph 102 that can be made in the direction of parents' nodes without meeting a node whose nucleus result affects the value of the nucleus of the current node N, and without meeting a node of an atom of the type A2 (a control split node).
PAD=T;

The effect of having the PAD attribute 102*b* is in that an atom with PAD>0 can be executed while the result of its parent executable atom 1020 is still unknown, i.e., while the previous executable atom 1020 is still not "resolved". This allows Run-Ahead PVM atomic threads 1040 to operate. PVM atomic threads 1040 are different from traditional threads, as will be discussed further in conjunction with FIG. 10.

Furthermore, the PAD 102*b* of atom A represented by the node N shows the "Allowable distance" between the last resolved parent atom 1020 of some node R and the atom 1020 of node N. By the "Allowable distance", we mean the distance, measured in nodes, between two nodes currently executed by different PVM atomic threads 1040, as will be described further.

Non-executable nodes, i.e., nodes that make the graph 228 easier to read, like the "Else" node (see FIG. 4) are not counted in the calculation of T. Additionally, terminal nodes, i.e., a node representing "Rewind" atom A3, terminates the process of calculating T and PAD in that direction.

In the example of FIG. 5, PAD attributes 102b of nodes are shown in squares. As mentioned already, the PCS 104 referred to by a PVM atom nucleus 102a corresponds to a sequence of bytecode/other executable code instructions corresponding to one source code 107 instruction, as seen on FIGS. 3, 5, and 7. Then, in FIG. 5, if logic splits are resolved in the direction of the left FFCV, the PVM 99 will need to execute five consecutive PCSs 104 in order to pass the left FFCV. Those five PCSs 104 are marked by their corresponding PAD attributes 102b as 0.0.0.1.0

Below we will show that within the PVM 99, implementation of PVM code segments 104, explained below, allows parallel execution, reducing the number of such consecutive steps to be four, i.e. 20% less.

A more elaborate example is on FIG. 7, where corresponding PAD attributes 102b are assigned to the atoms 1020 on the path from the method entry down to the atom A.

In the traditional threads implementation, the number of PCSs 104 that would be executed on the path to the code corresponding to atom A and including the code of atom A is 18. These PCSs 104 are marked by their PAD attributes 102b: 0.1.0.0.0.1.2.0.0.0.0.1.2.3.4.0.0.1.

Below we will show that PVM code segments 104 allow parallel execution, making the number of such consecutive PCSs 104 to be potentially as low as 10, i.e., 44% less than in the traditional threads implementation.

That best case scenario would occur if the execution of the atom 701a takes as long as execution of atom 701b; if execution of atom 702a takes as long as execution of the two atoms 702b and 702c; if execution of the 703 b, c, d, e atoms takes as long as execution of the 703a atom; and if execution of the 704b atom takes as long as execution of the 704a atom. This would be in the best case scenario. However, even in the worst case scenario, we save execution time by having parallel execution of the PCSs 104.

We can approximate saving in execution time if all the PCSs 104 would take the same time to execute. In the previous example, this saving would be by four steps, i.e., 14 steps instead of 18 steps, or 22%.

Figure 10:
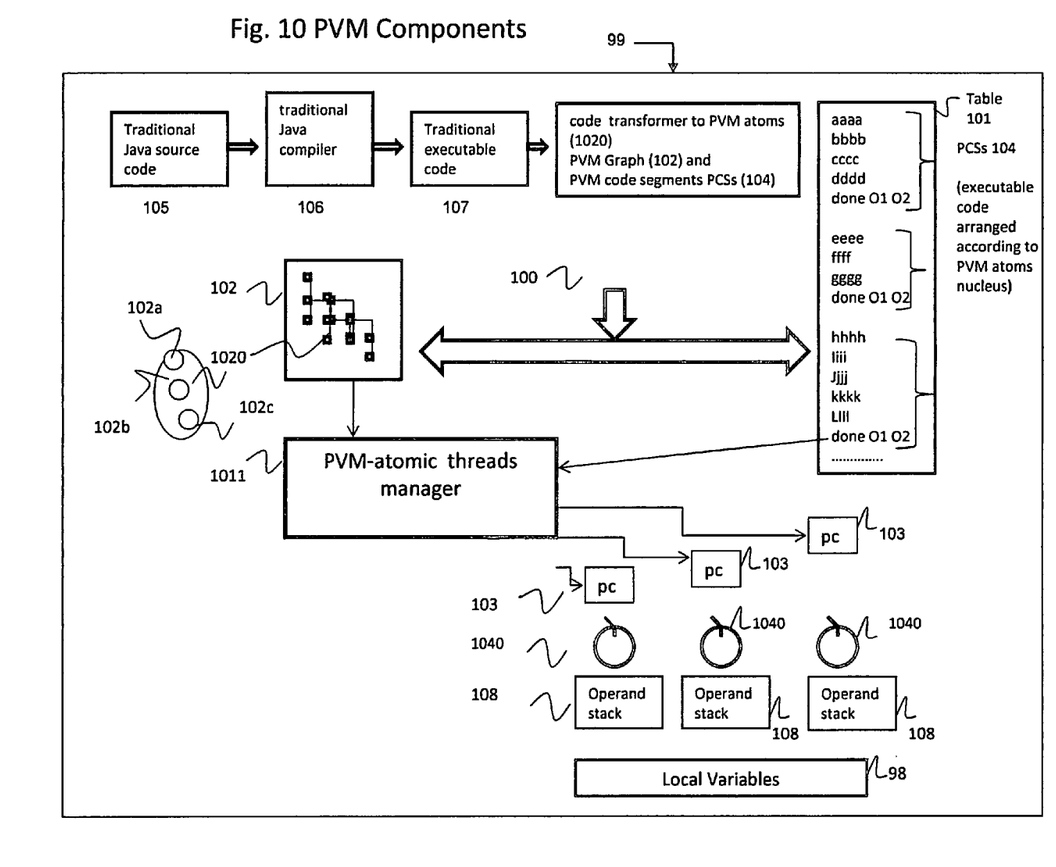
FIG. 10 is a block diagram showing components of a Pinball Virtual Machine 99 of the present invention implementing a multi-threading process in which a plurality of PVM atomic threads 1040 can be executed simultaneously.

FIG. 10, "PVM Components", shows a Pinball Virtual Machine 99 that can execute several PVM atomic threads 1040 simultaneously. Such a PVM 99 can be implemented on a multi-core processor 140 or on a single-core processor 140. In order to achieve the advantages of speed made possible by PVM 99, PVM 99 finds its greatest utility when implemented on a multi-core processor 140.

PVM 99 implementation of a VM differs from the traditional in that it has the following additional components:
1. Executable code (or bytecode) transformer 100 that transforms executable code into PVM Atoms 1020 built into a PVM Graph 102 and into a table 101 of PVM Code Segments 104.
2. The PCSs 104 are arranged within table 101 according to PVM atoms 1020.
3. PVM atoms 1020 having a nucleus 102a containing the offsets of a corresponding PCS 104 within the PCS table 101.
4. A PVM Graph 102 built from PVM atoms 1020.
5. PVM atomic threads 1040.
6. PVM atomic threads program counters (pc) 103, one for each PVM atomic thread 1040.
7. An Operand Stack 105 for each PVM atomic thread 1040.
8. A PVM atomic threads manager 1011.

PVM atomic threads 1040 are different from traditional VM threads, as is explained here for the example of JVM threads. Traditionally, at any point, each JVM thread executes the code of a single method, the current method for that thread. That is, a single method is not shared between different JVM threads. PVM atomic threads 1040 are implemented to operate within a single method. PVM atomic threads 1040 share the method's frame and the method's local variables 98. Each PVM atomic thread 1040 has its own pc (program counter) 103 and its own Operand stack 108.

PVM atomic threads 1040 execute one or more steps where each step is the length of one PCS 104. Upon completion of the execution of each PCS 104, the PVM atomic thread 1040 reports to PVM atomic threads manager 1011 by executing the command "done O1 O2" announcing the result of the atom's execution.

PVM atomic threads 1040 do not introduce new race conditions, since PVM atomic threads manager 1011 is conducting PVM atomic thread 1040 activities based on the PAD attributes 102b of PVM atoms 1020. Please note that a race condition that is already present in the original source code 105 before the traditional compilation step 106 into the traditional executable code 107 could still be present in the resulting execution by the PVM 99.

For the purpose of example, we will refer here to JVM bytecode 107. The following bytecode 107 instructions are not used in the PVM 99 implementation:
goto, goto_w Also referring to the example of the JVM bytecode 107, PVM 99 implementation of the following conditional branch instructions (control splits):
ifeq, iflt, ifle, ifne, ifgt, ifge, ifnull, ifnormull, if_icmpeq, if_icmpne, if_icmplt, if_icmpgt, if_icmple, if_icmpge, if_acmpeq, if_acmpne
is modified to not perform jumps (jumps are controlled by the PVM Graph 102 and PVM atomic threads manager 1011), but instead to return to PVM atomic threads manager 1011 the result of the comparison. This Boolean value of the result is returned in the operand O2 of the additional instruction "done O1 O2", as described below.

Each PCS 104 within table 101 is terminated by a new instruction "done". The instruction "done" has two operands, O1 and O2. Operand O1 holds the index of the node of PVM Graph 102 of the corresponding atom 1020. If the atom 1020 is of type A2, the operand O2 will have the Boolean value of the result.

Upon receiving a signal from instruction "done", in addition to signaling for execution of the atom 1020 that is the child of the atom 1020 reporting "done", if such a child exists and is not marked "resolved" by its attribute 102c, to be executed on the same atomic thread 1040, PVM atomic threads manager 1011 will start a new atomic thread 1040 starting with an atom 1020 that points by its PAD attribute 102b to the atom that has reported "done", if an atom 1020 with such an attribute exists. As many new atomic threads 1040 will be started at this time as there are atoms 1020 pointing with their PAD attribute 102b to the "done" atom 1020.

Referring to the example of FIG. 7, and looking at PVM atoms 703 a,b,c,d,e, we see that there will be four PCSs 104 running at the same time (scheduled to run at the same time and running at the same time if enough CPUs 140 are available), i.e. 703b, 703c, 703d, and 703e. Their corresponding PVM atoms 703b, c, d, and e are resolved for execution at the time of execution of atom 703a. That is because Parent Affect Distances (PADs) 1, 2, 3, and 4 allow these "PAD Distances" from the atom 703a.

If a "done O1 O2" instruction coming into PVM atomic threads manager 1011 belongs to an A2 atom (control split atom), the PVM atomic threads manager 1011 gets the Boolean value of the operator O2, and depending on that value, activates either the left child or right child of an atom 1020 pointed to by operator O1.

PVM atoms 1020 that are children of control split atoms (of type A2) are not scheduled for execution until the corresponding A2 atoms have been resolved (their "done" instruction fired). That is because prior to that PVM atomic threads manager 1011 does not know which PVM atom 1020 to schedule, its left child or its right child.

Each "done" instruction results in setting of the "resolved" attribute 102c of the corresponding PVM atom 1020 to Boolean "true". That allows the PVM atomic threads manager 1011 to operate correctly.

Each time that PVM atomic threads manager 1011 gets to PVM atom A3 (process control rewind atom) as a result of its parent atom being "resolved", PVM atomic threads manager 1011 resets all the "resolved attributes" 102c of this branch (that is done by going to the parent node) that have the state "true" to the state "false". That allows for the loops to function correctly.

If the corresponding A3 atom is representing a Return statement (its Free Fall attribute is Zero), all the PVM atomic threads 1040 are reset to "available", by setting their PC Program counter to 0 (zero). That makes them available for the next method's frame.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, the disclosure is to be deemed as effectively disclosing and thus covering at least such extrapolations.

By way of a further example, it is understood that configuring a computer to include the Pinball Virtual Machine method or its equivalent for the implementation of a targeted computing process is part of the disclosure of invention provided herein. Accordingly, a computer-readable medium or another form of a computing product or machine-instructing means (including but not limited to, a hard disk, a compact disk, a flash memory stick, a downloading of manufactured instructing signals over a network, and/or the like may be used for instructing an instructable machine (e.g., computer 140) to automatically carry out such activities where the activities include what is described in this disclosure, are understood to be within the scope of the disclosure.

The modules of PVM 99 can be implemented in hardware, firmware, or software, or any combination thereof, and/or using nanotechnology, molecular computing, or any computing techniques of the future. Said modules can reside on one or more computer readable media, such as one or more hard disks, floppy disks, thumb drives, optical storage means, or any combination thereof. The expression "computer readable media" includes downloading modules from a location in a network, such as the Internet.

Reservation of Extra-Patent Rights, Resolution of Conflicts, and Interpretation of Terms After this disclosure is lawfully published, the owner of the present patent application has no objection to the reproduction by others of textual and graphic materials contained herein, provided such reproduction is for the limited purpose of understanding the present disclosure of invention and of thereby promoting the useful arts and sciences. The owner does not, however, disclaim any other rights that may be lawfully associated with the disclosed materials, including but not limited to, copyrights in any computer program listings or art works (including iconic symbols) or other works referred to herein, and to trademark or trade dress rights that may be associated with coined terms or art works described herein, and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by the claims appended hereto. The issued claims are not to be taken as limiting Applicants' right to claim disclosed, but not yet literally claimed subject matter by way of one or more further applications including those filed pursuant to 35 U.S.C. §120 and/or 35 U.S.C. §251.

What is claimed is:

1. A pinball virtual machine (PVM) stored in a memory, to implement simultaneous execution of a plurality of PVM atomic threads within one software program process, implemented by a processor, the PVM comprising:
   a code transformer to transform computer source code or executable code of the software program process to a plurality of PVM atoms, a plurality of PVM graphs, and a plurality of PVM code segments;
      wherein each of the plurality of PVM atoms having at least two attributes from the following set of attributes:
         parent control input, rewind control input, shift potential control output, free fall control output, atom nucleus, parents affect distance and resolved;
      wherein each of the plurality of PVM atoms having atom nucleus attribute has a reference to one of the plurality of PVM code segments;
      wherein each of the plurality of PVM code segments is a sequence of bytecode or other executable code instructions corresponding to one or more source code statement of the computer software process;
      wherein the plurality of PVM atoms are organized in a PVM graph of the plurality of PVM graphs in a form of a bi-directional tree;
   a PVM atomic thread manager to schedule simultaneous execution of the plurality of PVM atomic threads to execute the plurality of PVM code segments based on the attributes of the plurality of PVM atoms in the PVM graph; and
   the PVM atomic thread manager to control a run-ahead execution of the PVM atomic threads based on a state of the resolved attributes of PVM atoms of the plurality of PVM atoms that are pointed to by other PVM atoms of the plurality of PVM atoms having the parent affect distance attributes.

2. The PVM of claim 1 wherein the plurality of PVM atoms are generic, separately reprogrammable, and categorized into three types including a freefall atom, a shift potential atom and a control rewind atom.

3. The PVM of claim 2 wherein freefall atoms and shift potential atoms are executable and contain atom nucleus attributes; and
control rewind atoms are non-executable and do not contain atom nucleus attribute.

4. The PVM of claim 2 wherein Boolean values of the shift potential attributes of shift potential atoms are being set by executing the PVM code segments of the PVM atoms by specialized A2NucleusProcessingThreads.

5. The PVM of claim 1 wherein conditional branch instructions of the software program process are modified to not perform the conditional branch, but instead to report to the PVM atomic thread manager a Boolean value of shift potential obtained by executing the PVM code segment referenced by the atom nucleus attribute of the PVM atom corresponding to the conditional branch instruction.

6. The PVM of claim 1 wherein the PVM is implemented on a multi-core computer processor.

7. The PVM of claim 1 wherein the PVM thread manager prevents any new race conditions by scheduling simultaneous execution of the PVM atomic threads based on the parent affect distance attributes of the PVM atoms.

8. The PVM of claim 1 wherein execution of the software program process is displayed on a screen by the plurality of PVM atoms on the plurality of PVM graphs coupled with the corresponding source code statements.

9. The PVM of claim 1 wherein the PVM atomic thread manager determines a number of the PVM atomic threads that can be scheduled simultaneously based on the state of the resolved attribute of the PVM atoms that are pointed to by the other PVM atoms having the parent affect distance attributes.

10. A method for implementing simultaneous execution of a plurality of PVM atomic threads within one software program process, the method comprises:
transforming, by a code transformer, computer source code or executable code of the software program process to a plurality of PVM atoms, a plurality of PVM graphs, and a plurality of PVM code segments;
wherein each of the plurality of PVM atoms having at least two attributes from the following set of attributes:
parent control input, rewind control input, shift potential control output, free fall control output, atom nucleus, parents affect distance and resolved;
wherein each of the PVM atoms having atom nucleus attribute has a reference to one of the plurality of PVM code segments;
wherein each of the plurality of PVM code segments is a sequence of bytecode or other executable code instructions corresponding to one or more source code statement of the computer software process;
wherein the plurality of PVM atoms are organized in a PVM graph of the plurality of PVM graphs in a form of a bi-directional tree;
scheduling, by a PVM atomic thread manager, simultaneous execution of the plurality of PVM atomic threads to execute the plurality of PVM code segments based on the attributes of the plurality of PVM atoms in the PVM graph; and
controlling, by the PVM atomic thread manager, a run-ahead execution of the PVM atomic threads based on a state of the resolved attribute of PVM atoms of the plurality of PVM atoms that are pointed to by other PVM atoms of the plurality of PVM atoms having the parent affect distance attributes.

11. The method of claim 10 wherein the plurality of PVM atoms are generic, separately reprogrammable, and categorized into three types including a freefall atom, a shift potential atom and a control rewind atom.

12. The method of claim 11 wherein freefall atoms and shift potential atoms are executable and contain atom nucleus attributes; and
control rewind atoms are non-executable and do not contain atom nucleus attribute.

13. The method of claim 11 wherein Boolean values of the shift potential attributes of shift potential atoms are being set by executing the PVM code segments of the PVM atoms by specialized A2NucleusProcessingThreads.

14. The method of claim 10 wherein conditional branch instructions of the software program process are modified to not perform the conditional branch, but instead to report to the PVM atomic thread manager a Boolean value of shift potential obtained by executing the PVM code segment referenced by the atom nucleus attribute of the PVM atom corresponding to the conditional branch instruction.

15. The method of claim 10 wherein the PVM is implemented on a multi-core computer processor.

16. The method of claim 10 wherein the PVM thread manager prevents any new race conditions by scheduling simultaneous execution of the PVM atomic threads based on the parent affect distance attributes of the PVM atoms.

17. The method of claim 10 wherein execution of the software program process is displayed on a screen by the plurality of PVM atoms on the plurality of PVM graphs coupled with the corresponding source code statements.

18. The method of claim 10 wherein the PVM atomic thread manager determines a number of the PVM atomic threads that can be scheduled simultaneously based on the state of the resolved attribute of the PVM atoms that are pointed to by the other PVM atoms having the parent affect distance attributes.

19. The method of claim 11 wherein the PVM atoms are spatially distributed in the plurality of PVM graphs in a specific order.

20. The method of claim 19 wherein the reprogrammable PVM atoms can be implemented by any media and by any substance including a Nano technological substance.

21. The method of claim 19 wherein the ordered in space PVM atoms constituting the plurality of PVM graphs can be implemented within any media and any substance including a Nano technological substance.

22. The method of claim 19 wherein the ordered in space PVM atoms constituting the plurality of PVM graphs are positioned consistently;
wherein the PVM atom correlated to the Free Fall output of its parent PVM atom is always positioned in the same spatial direction from the parent PVM atom, and
wherein the PVM atom correlated to the Shift Potential Output of its parent PVM atom is always positioned in the same spatial direction from the parent PVM atom, and
wherein the directions of spatial positions corresponding to the above Free Fall output and Shift potential outputs are not same.

* * * * *